US012599157B2

(12) United States Patent
Hofmekler

(10) Patent No.: US 12,599,157 B2
(45) Date of Patent: Apr. 14, 2026

(54) NATURAL SWEETENING FLAVOR COMPOSITION

(71) Applicant: Ori Hofmekler, Tarzana, CA (US)

(72) Inventor: Ori Hofmekler, Tarzana, CA (US)

(73) Assignee: SweetScience LLC, Tarzana, CA (US)

( * ) Notice: Subject to any disclaimer, the term of this patent is extended or adjusted under 35 U.S.C. 154(b) by 690 days.

(21) Appl. No.: 16/663,600

(22) Filed: Oct. 25, 2019

(65) Prior Publication Data

US 2020/0128860 A1 Apr. 30, 2020

Related U.S. Application Data

(60) Provisional application No. 62/819,901, filed on Mar. 18, 2019, provisional application No. 62/815,139, filed on Mar. 7, 2019, provisional application No. 62/815,165, filed on Mar. 7, 2019, provisional application No. 62/788,354, filed on Jan. 4, 2019, provisional application No. 62/788,384, filed on Jan. 4, 2019, provisional application No. 62/750,657, filed on Oct. 25, 2018.

(51) Int. Cl.
 *A23L 27/30* (2016.01)
 *A23L 27/12* (2016.01)

(52) U.S. Cl.
 CPC .............. *A23L 27/33* (2016.08); *A23L 27/13* (2016.08); *A23V 2002/00* (2013.01)

(58) Field of Classification Search
 CPC ....................................................... A23L 27/33
 See application file for complete search history.

(56) References Cited

U.S. PATENT DOCUMENTS

| | | | |
|---|---|---|---|
| 3,767,423 A | 10/1973 | Tsantir et al. | |
| 5,433,965 A | 7/1995 | Fischer et al. | |
| 6,461,659 B1 | 10/2002 | Zhou | |
| 7,229,658 B1 | 6/2007 | Inoue | |
| 7,749,535 B2 | 7/2010 | Mower | |
| 8,367,137 B2 | 2/2013 | Prakash et al. | |
| 8,816,067 B2 | 8/2014 | Naeye | |
| 2004/0137094 A1 | 7/2004 | Mower | |
| 2004/0254367 A1 | 12/2004 | Oku | |
| 2005/0074521 A1 | 4/2005 | Bartnick | |
| 2005/0244543 A1 | 11/2005 | Takaichi | |
| 2006/0093720 A1 | 5/2006 | Tatz | |
| 2007/0116819 A1 | 5/2007 | Prakash et al. | |
| 2007/0116823 A1 | 5/2007 | Prakash | |
| 2007/0116829 A1 | 5/2007 | Prakash | |
| 2007/0116837 A1 | 5/2007 | Prakash | |
| 2007/0116840 A1 | 5/2007 | Prakash | |
| 2007/0128311 A1* | 6/2007 | Prakash .................... | A61P 9/00 426/3 |
| 2008/0226788 A1 | 9/2008 | Chang et al. | |
| 2009/0162511 A1 | 6/2009 | Shi | |
| 2010/0119600 A1 | 5/2010 | Opheim | |
| 2010/0178389 A1 | 7/2010 | Jia et al. | |

| | | |
|---|---|---|
| 2010/0267847 A1 | 10/2010 | Yoshinaka et al. |
| 2010/0284972 A1 | 11/2010 | Naeye |
| 2011/0189348 A1 | 8/2011 | Inoue |
| 2012/0183648 A1 | 7/2012 | Sun et al. |
| 2013/0171280 A1 | 7/2013 | Cho et al. |
| 2014/0010939 A1 | 1/2014 | Krohn et al. |
| 2014/0099403 A1 | 4/2014 | Prakash |
| 2014/0171519 A1 | 6/2014 | Prakash |
| 2014/0199466 A1 | 7/2014 | Pohrte |
| 2015/0098978 A1 | 4/2015 | Gao |
| 2015/0189904 A1 | 7/2015 | Prakash et al. |
| 2015/0320823 A1 | 11/2015 | Cho et al. |
| 2016/0015064 A1 | 1/2016 | Luo et al. |
| 2016/0165941 A1 | 6/2016 | Hofmekler |
| 2017/0105432 A1 | 4/2017 | Karanewsky et al. |

FOREIGN PATENT DOCUMENTS

| | | |
|---|---|---|
| CA | 2495400 | 4/2004 |
| CN | 102076226 A | 5/2011 |
| CN | 103561755 A | 2/2014 |
| CN | 106072424 A | 11/2016 |
| CN | 106107898 | 11/2016 |
| EP | 2025246 A1 | 2/2009 |
| WO | WO 2006/013416 A1 | 2/2006 |
| WO | WO 2009/082476 A1 | 7/2009 |
| WO | WO 2016/097067 A1 | 6/2016 |
| WO | WO 2018/229776 A1 | 12/2018 |

OTHER PUBLICATIONS

International Search Report of PCT Application No. PCT/IL18/50664, mailed Sep. 25, 2018.
International Search Report of PCT Application No. PCT/IL18/50661, mailed Oct. 15, 2018.
"Vanilla planifolia", Publication Date: Dec. 16, 2016, Retrieved Date: Sep. 18, 2018, https://en.wikipedia.org/w/index.php?title=Vanilla_planifolia&oldid=755184159; pp. 1-3 p. 1, Para 1: p. 2, para 2.
"Luo Han Guo (also known as Monk Fruit)", Publication Date: Jun. 13, 2017, Retrieved Date: Sep. 18, 2018, http://www.sugar-and-sweetener-guide.com/luo-han-guo.html, pp. 1-4 p. 1, Para 1; p. 1 Para 4.
International Search Report of PCT Application No. PCT/US2018/058161, mailed Jan. 13, 2020.
Gale Encyclopedia of Alternative Medicine, Copyright 2005, The Gale Group, Inc.
Dharmananda: Luo Han Guo: Sweet Fruit Used as Sugar Substitute and Medicinal Herb; published online Jun. 24, 2004 at: http://web.archive.org/web/20040624081731 http://www.itmonline.org/arts/luohanguo.htm.

(Continued)

*Primary Examiner* — Jeffrey P Mornhinweg
(74) *Attorney, Agent, or Firm* — PEARL COHEN ZEDEK LATZER BARATZ LLP

(57) ABSTRACT

The present invention is directed to high potency sweeteners having at least one sweetening agent and at least one flavorant, wherein the sweetening agent is present in an amount of about 80% to about 97% by weight of the composition and the flavorant is present in an amount of about 3% to about 20% by weight of the composition. The invention is also directed to sugar substitute compositions having resistant dextrin fiber, at least one sweetening agent, at least one flavorant, and processed rice extract.

11 Claims, 3 Drawing Sheets

(56)     References Cited

OTHER PUBLICATIONS

SSG: Sugar and Sweet Guide: Glycemic Index; published at least by Jun. 30, 2014 at: https://web.archive.org/web/2014630100657/http://www.sugar-and-sweetener-quide.com/glycemic-index-for-sweeteners.html (Year: 2014).

Search Report for European Patent Application No. 19 87 5590, dated Jul. 12, 2022.

Search Report for Chinese Patent Application No. 201980085920.9, dated Mar. 20, 2023.

* cited by examiner

Rice Hulls

Grinding

Sifting

Steam Sterilization

Rare Earth Magnets

Packaging

NATURAL SWEETENING FLAVOR COMPOSITION

CROSS REFERENCE TO RELATED APPLICATIONS

This application claims the benefit of U.S. Provisional Application No. 62/750,657, filed on Oct. 25, 2018; No. 62/788,354, filed on Jan. 4, 2019; No. 62/788,384, filed on Jan. 4, 2019; No. 62/815,139, filed on Mar. 7, 2019; No. 62/815,165, filed on Mar. 7, 2019; and No. 62/819,901, filed on Mar. 18, 2019, all of which are incorporated herein by reference.

BACKGROUND OF THE INVENTION

Sweeteners are natural and/or synthetic food additives that simulate the sweet taste of sugar. Yet, the sweet taste of sweeteners is typically slower in onset and longer in duration than the sweet taste of sugar. This difference can negatively impact the taste balance of food and beverages compositions. The sweeteners can cause impairments in the temporal sense of sweetness and olfactory sense of flavor with lower maximal response, which may involve tongue and oral cavity numbing/tingling, as well as, off tastes that diminish iterative tasting. Off taste includes bitter taste, metallic taste, cooling, astringent, licorice-like tastes, and/or a lingering sweet taste that negatively impact flavor profile. Generally, the replacement of sugar by sweeteners in food and beverages requires flavor ingredients to reformulate and rebalance taste components, which can lead to increased costs and still fail to yield a desirable flavor profile. Thus, there is a need for low calorie natural sugar substitutes that have a low glycemic index and low in calories, and that can replace sugar in food and beverages without inducing undesirable flavor profiles or requiring extensive reformulation.

Artificial sweeteners, such as Aspartame™, Sucralose™, and Saccharin™, are common cost-effective alternatives to natural sugar mainly because less sweetener material is required (as compared to sugar) to achieve the same level of sweetness. However, artificial sweeteners, aside from having unhealthy side effects, exhibit undesirable taste characteristics, such as chemical taste, bitterness, and lingering sweet taste. To overcome organoleptic flaws and simulate the taste of natural sugar, some artificial sweeteners are made with glycemic carriers, such as maltodextrin or sucrose, which renders them high glycemic substances. Sweeteners with glycemic carriers, whether natural or synthetic, can induce the glycemic effects of sugar, which they intend to replace.

Artificial sweeteners also fail to bind ingredients in a manner similar to natural sugar. This limitation diminishes their use in baking applications and use in confectionery. In order for this limitation to be overcome, artificial sweeteners include binding additives (aka binders), such as inulin and various sugar alcohols; however, such additives can cause a laxative effect and consequently, render artificial sweeteners undesirable to consumers. Furthermore, inulin and sugar alcohols have a weaker binding capacity than natural sugar. Accordingly, when artificial sweeteners with these ingredients are used in baking, the products have a smaller size and/or different texture when compared to the same products produced with natural sugar. Thus, even with added binders, the artificial sweeteners still lack many of the desired properties and functions of natural sugar.

Artificial sweeteners may be detrimental to consumer's health. Having been linked to diseases associated with diabetes and obesity, artificial sweeteners were found to disrupt human gut bacteria causing increases in bacterial strains of the *Bacteroides* genus, which contains members linked to metabolic syndrome disorders and opportunistic infections. In addition, artificial sweeteners are believed to interact with sweet taste receptors in the gut resulting in insulin spikes, which may lead to insulin resistance and increases in body fat. Thus, artificial sweeteners are of particular concern to individuals that are overweight, obese, or already have elevated insulin or blood sugar levels.

Natural sugar substitutes lack many functional properties of sugar. Natural sugar substitutes such as Isomalt™, Inulin™, Stevia™, Truvia™, Palatinose™, and Monatin™ have only about 40% to 60% of the sweetness of sugar, which limits their usability and requires additional sweetening and flavoring ingredients. Also, the additional ingredients increase the cost and volume of the natural sugar substitutes. Yet, even in cases where sweetness levels are adjusted to match the sweetness of sugar, natural sugar substitutes failed to mimic the sweet taste of sugar. For instance, aftertaste, a common drawback of all sweeteners, is common to natural sugar substitutes. Stevia extracts, for example, are natural sugar substitutes with inherent afternotes that include bitterness, metallic taste, licorice, and lingering sweet, all also found in Lou-Han Guo extracts. Still other natural sugar substitutes, such as sugar alcohols and glycerin, contain the same amount of calories on a per gram comparison as natural sugar, despite having a lower glycemic index than sugar. Sugar alcohols, such as maltitol, sorbitol, or lactitol, cause digestive side effects even when applied in small amounts, and, therefore, they are of limited use and cannot be used in amounts sufficient to replace sugar in dietary products.

Despite the numerous efforts to replace sugar, artificial and natural sweeteners still lack the desired taste and functional properties of sugar. Thus, there is a need for sugar substitutes that overcome the limitations in at least three categories: taste, function, and healthiness. Specifically, there is a need for natural sugar substitutes with the desired taste and functional properties of sugar, but without the without the caloric content, glycemic effects of sugar, and/or taste and function flaws of artificial sweeteners.

SUMMARY OF THE INVENTION

One embodiment of the invention encompasses a high potency sweetener comprising at least one sweetening agent and at least one flavorant, wherein the sweetening agent is present in an amount of about 80% to about 97% by weight of the composition and the flavorant is present in an amount of about 3% to about 20% by weight of the composition. In another embodiment, the sweetening agent is present in an amount of about 85% to about 92% by weight of the composition. In yet another embodiment, the flavorant is present in an amount of about 8% to about 15% by weight of the composition. One embodiment of the invention encompasses a high potency sweetener, wherein the sweetener is monk fruit extract, stevia extract, or a combination thereof. In one embodiment, the monk fruit extract has 3.5% to 6% mogroside V by weight. In another embodiment, the monk fruit extract has 13% mogroside by weight. In yet another embodiment, the flavorant is at least one of vanillin, lemon oil, acetic acid, citric acid, lactic acid, cinnamon, ginger extract, cocoa, coffee, cardamom, milk minerals, curcumin, turmeric fruit flavor extract, almond extract, hazelnut extract, pistachio extract, or peanut extract. In one embodiment, the flavorant is vanillin, lemon oil, or a combination thereof.

The invention also encompasses a sugar substitute composition also referred herein a "sweetening fiber," comprising resistant dextrin fiber, at least one sweetening agent, at least one flavorant, and processed rice extract, wherein the resistant dextrin fiber is present in an amount of about 90% to about 99% by weight of the composition and the processed rice extract is present in an amount of about 0.3% to about 2% by weight of the composition. In one embodiment, the resistant dextrin fiber is present in an amount of about 96% to about 99% by weight of the composition. In another embodiment, the processed rice extract is present in an amount of about 0.5% to about 1.5% by weight of the composition.

In one embodiment of the invention, the sugar substitute composition has a sweetening agent present in an amount of about 0.2% to about 2% by weight of the composition. In another embodiment, the sweetening agent is monk fruit extract, stevia extract, or a combination thereof. In yet another embodiment, the monk fruit extract has 3.5% to 6% mogroside V by weight. In one embodiment, the monk fruit extract has 13% mogroside by weight. In another embodiment, the flavorant is present in an amount of about 0.1% to about 2% by weight of the composition. In another embodiment, the flavorant is at least one of vanillin, lemon oil, acetic acid, citric acid, lactic acid, cinnamon, ginger extract, cocoa, coffee, cardamom, milk minerals, curcumin, turmeric fruit flavor extract, almond extract, hazelnut extract, pistachio extract, or peanut extract. In yet another embodiment, the flavorant is vanillin, lemon oil, or a combination thereof.

The invention also encompasses a sugar substitute composition comprising resistant dextrin fiber, at least one sweetening agent, at least one flavorant, and processed rice extract, wherein the processed rice extract is made by wetting the rice extract in the form of rice hull with water in a weight percentage of about 14% to about 16% by weight of the water to rice hull followed by drying at a temperature of about 50° C. to about 100° C.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A illustrates that, while the flavor of the chocolate product made with the composition of Example 2 was perceived as slightly different, the appearance, aroma, and flavor tested favorably. FIG. 2B illustrates that the chocolate product made with the composition of Example 2 was indistinguishable from the sugar made product.

Figure 1:
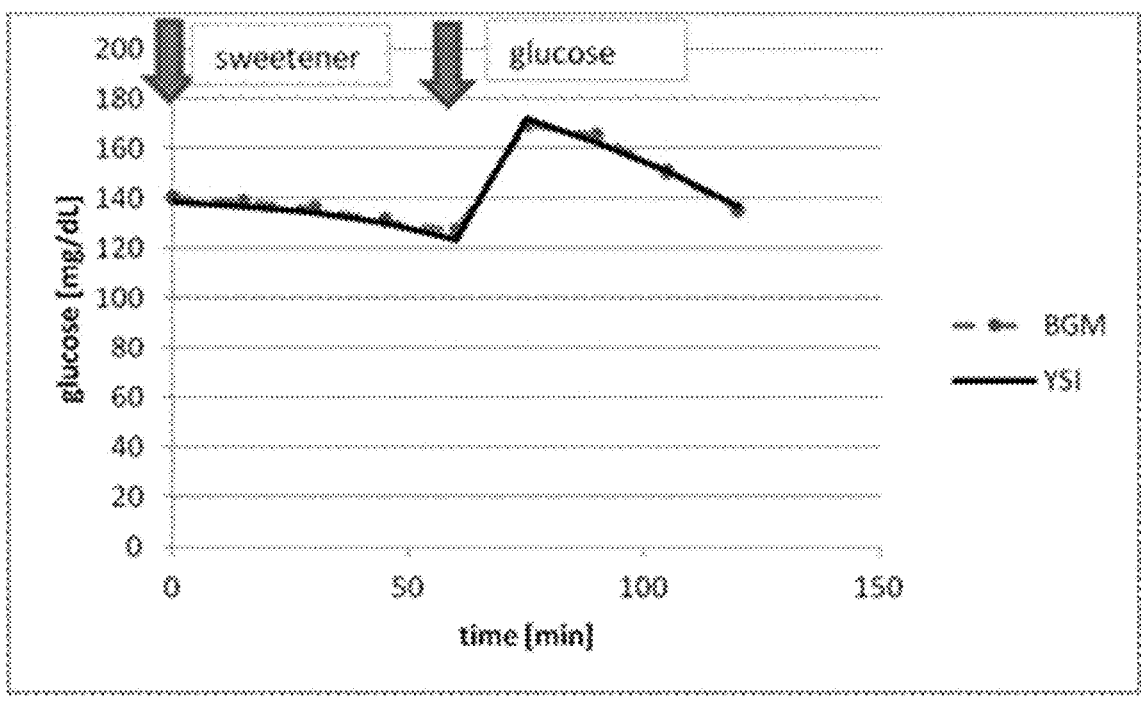
FIG. 1 illustrates the overall blood glucose levels of subjects when they were administered lemonade using sugar or a composition of the invention as described in Example 2.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The compositions of the present invention address the prior art deficiencies by providing sugar substitute compositions that do not yield typical artificial sweetener aftertastes, while concurrently providing compositions with a low glycemic index. The compositions may be as sweet as sucrose or much sweeter than sucrose on a weight basis, such that the same or less sweetening composition will be necessary to achieve the same sweetness of sugar without the caloric and/or glycemic effect of natural sugar. Some compositions may include a specially treated fiber source that is digestive resistant (e.g., resistant starch) to yield organoleptic properties and functions equivalent to sugar during baking and the making of confections, while allowing for the consumption without the side effects typically associated with digestive resistance substances (e.g., sugar alcohols and inulin). Some compositions of the present invention may include only naturally occurring ingredients for the natural products market.

As used herein unless otherwise specified, the term "monk fruit" refers to *Siraitia grosvenorii* swingle (also known Han Luo Guo) that is a herbaceous perennial vine of the Cucurbitaceae (gourd) family, native to southern China, northern Thailand, and South Asia. Typically, monk fruit juice typically contains 3.5% up to 60% mogroside V (MV) by weight; however, monk fruit juice with mogroside V (esgoside) in about 3.5% by weight and an overall mogroside content of 13% by weight is preferred. In contrast, refined monk fruit extracts generally contain up to 60% mogroside V by weight and an overall mogro side content of 80% by weight.

As used herein unless otherwise specified, the term "resistant dextrin fiber" refers to a type of dextrin with a low viscosity that is resistant to digestion in human enzymes. Being a low viscosity fiber, the resistant dextrin fiber has a low internal friction of a moving liquid and a low resistance to flow. The fiber's matrix comprises polysaccharide matrix that is resistant to digestion comprising glucose polymers with a degree of polymerization (DP) ranging from 12 to 25. The DP is lower than that of starch and may contribute to the fiber solubility and binder properties. The resistant dextrin fiber has two types of glycosidic linkages, namely alpha and beta. Being resistant to digestion by human enzymes, the glycosidic linkages occur between carbon-1 of one monosaccharide and carbons-6, 2, 3, and 4 of the other monosaccharide of the resistant dextrin molecule. Glycosidic linkages are classified "alpha" when the hydroxyl (OH) group on carbon-1 is below the monosaccharide ring and the linkages occur on same side of the molecule. Glycosidic linkages are classified "beta" when the hydroxyl group is above the molecule's plane and the linkages occur on opposite sides of the molecule. The glycosidic linkages of the resistant dextrin fiber include beta 1,6; alpha 1,2; and/or beta 1,2, alpha 1,3 and beta 1,4. In comparison, glycosidic linkages in carbohydrates that are digestible by human enzymes occur between carbons 2-4 and between carbons 2-6 in alpha configuration, namely alpha 2-4 and alpha 2-6 linkages.

As used herein unless otherwise specified, the term "BRIX" or "Degrees Brix" (° Bx) refers to the sugar content of an aqueous solution, wherein one degree Brix is equivalent to one gram of sucrose in 100 grams of solution (such as water) and represents the strength of the solution as percentage by mass. Brix is defined and can be measured as the percentage of sucrose per weight in water solution or as the percentage of solid matter per weight in solutions such as wine, maple syrup, honey, or carbonated beverages. Sucrose content is measured by three different methods: specific gravity, refractive index and infrared absorption spectra. Accordingly, measuring Brix° value is done using different equipment, namely hydrometers, refractometers and infrared absorption devices, each of which yields different Brix° values. In the invention, Brix° value was measured in Hanna Digital Refractometer H196822 and Atago 3150 SMART-1 Sugar Refractometer.

One embodiment of the invention encompasses high potency sweetener compositions comprising at least one sweetening agent and at least one flavorant, wherein the weight ratio of sweetening agent to flavorant is about 4:1 to about 32:1 by weight.

When the high potency sweetener composition comprises at least one sweetening agent and at least one flavorant, then the sweetening agent is present in an amount of about 80% to about 97% by weight of the composition and the flavorant is present in an amount of about 3% to about 20% by weight of the composition. In a preferred high potency sweetener composition, the sweetening agent is present in an amount of about 85% to about 92% by weight of the composition and the flavorant is present in an amount of about 8% to about 15% by weight of the composition. In a more preferred high potency sweetener composition, the sweetening agent is present in an amount of about 88% to about 92% by weight of the composition and the flavorant is present in an amount of about 8% to about 12% by weight of the composition.

The sweetening agent includes, but is not limited to, monk fruit extract, stevia leaf extract, or a specially processed scorched sugar. Scorched sugar is prepared in a similar manner to caramelized sugar however with an object to form a scorched composition. The preparation of scorched sugar involves heating sugar at 150° C. in a copper kettle for a time range required to yield the composition desired scorch effect and flavor profile, after which the resultant product is ground into a powder (80-100 mesh) or granules (40-80 mesh). The scorched sugar can be made from various types of sugar including cane sugar, beet sugar, maple sugar, molasses, malt sugar and honey; whereas the time under heat can vary with the amount of material used.

The flavorant includes, but is not limited to, vanillin, lemon oil, acetic acid, citric acid, lactic acid, cinnamon, ginger extract, cocoa, coffee, cardamom, milk minerals (e.g., magnesium, sodium, potassium, citrate, chloride, calcium phosphate), curcumin, turmeric, fruit flavor extract, almond extract, hazelnut extract, pistachio extract, peanut extract, and malt flavor extract. Preferably, the flavorant is lemon oil or vanillin.

The invention also encompasses sugar substitute compositions with sweetness level equivalent to sucrose comprising resistant dextrin fiber, at least one sweetening agent, at least one flavorant, and processed rice extract.

The resistant dextrin fiber includes, but is not limited to, fibers having at least 70% resistant dextrin by weight. Typically, the resistant dextrin fiber in the composition is present in an amount of about 90% to about 99% by weight of the composition. Preferably, the resistant dextrin fiber in the composition is present in an amount of about 96% to about 99% by weight of the composition and more preferably in an amount of about 97% to about 98%. The resistant dextrin may be obtained from sources such as tapioca, maize, potato, or legume, among others.

The sweetening agent includes, but is not limited to, monk fruit extract, stevia leaf extract, and specially processed scorched sugar (as discussed above). Typically, the sweetening agent of the composition is present in an amount of about 0.2% to about 2% by weight of the composition. Preferably, the sweetening agent of the composition is present in an amount of about 0.3% to about 1.5% by weight of the composition and more preferably in an amount of about 0.5% to about 1%. The stevia extract contains sweetening diterpene glycoside compounds namely steviol glycosides. The stevia extract may comprise isolated or mixed steviol glycosides in concentrations of about 95% to about 99% by weight, which may include rebaudioside A, B, C, D, E, F and M, stevioside, steviol, steviolbioside, rubusoside and dulcoside A, in naturally occurring or enzymatically modified forms. Stevia extract or dry stevia extract may be obtained from the *Stevia rebaudiana* Bertoni plant grown in regions such as South America, Israel, and China.

The flavorant includes, but is not limited to, vanillin, lemon oil, acetic acid, citric acid, lactic acid, cinnamon, ginger extract, cocoa, coffee, cardamom, milk minerals (e.g., magnesium, sodium, potassium, citrate, chloride, calcium phosphate), curcumin, turmeric, fruit flavor extract, almond extract, hazelnut extract, pistachio extract, peanut extract, and malt flavor extract. Preferably, the flavorant is lemon oil or vanillin. Typically, the flavorant of the composition is present in an amount of about 0.1% to about 2% by weight of the composition. Preferably, the flavorant of the composition is present in an amount of about 0.2% to about 1.5% by weight of the composition and more preferably in an amount of about 0.2% to about 1%.

The flavorant ingredients may undergo special preparation or be prepared from natural resources. For instance, lemon oil can be in the form of powder and generated by cold pressed extract from lemon peel and pulp. Vanillin may be produced from a plant source, namely clove derived eugenol oil.

The processed rice extract includes, but is not limited to, rice hull, as prepared by the method described in this application. Preferably, the processed rice extract is rice hull that is exposed to the extra processing steps described herein. Typically, the processed rice extract of the composition is present in an amount of about 0.3% to about 2% by weight of the composition. Preferably, the processed rice extract of the composition is present in an amount of about 0.5% to about 1.5% by weight of the composition and more preferably in an amount of about 0.75% to about 1.5%.

When in the composition, the sweetening agent, flavorant, and processed rice extract can also be present in a particular weight ratio. Typically, the weight ratio of flavorant to processed rice extract to sweetening agent is about 1:4:5. Preferably, the weight ratio of flavorant to processed rice extract to sweetening agent is about 1:10:5; more preferably about 1:7:5; and even more preferably about 1:5:5.

The compositions of the present invention may include at least one optional ingredient in addition to those described above, as long as the optional ingredients are selected and quantified as not to augment the desired sweetness and functionality of the composition. Optional ingredients include, but are not limited to, flavoring ingredients, dairy-derived ingredients, salts, thickeners, anticaking agents, gum base, or coloring agents. Dairy-derived ingredients include, but are not limited to, powered forms of milk, whey, buttermilk, cream, cheese, milk minerals, or combinations thereof.

As mentioned above, some of the ingredients of the composition require special preparation to achieve the desired texture and flavor, such as the processed rice extract, the specially treated digestive resistant fiber, and the scorched sugar. In this application, when these particular ingredients are listed as part of the composition it is understood that they were prepared in the manner described above or below.

Unless otherwise indicated, ingredients incorporated in the present invention were sourced after being processed and produced via existing technologies know in the art. Nonetheless, in order to impart particular taste, organoleptic, and functional properties (e.g., solubility), certain ingredients were further processed.

In order to impart particularly desired properties to the composition, the fiber and rice extract were prepared as described below. Untreated or unprocessed fiber comprising 80%-90% by weight of resistant dextrin fiber failed to achieve the desired sugar-like properties. This is believed to be due to poor solubility and taste afternotes from insoluble fiber residues. Agglomeration treatment of fiber comprising 80%-90% by weight of resistant dextran did not improve the fiber properties of desired solubility and taste quality. Agglomeration treatment of fiber comprising 60%-70% by weight of resistant dextrin, however, yielded the desired solubility and desired taste quality with the least afternotes. The invention developed a direct correlation between agglomeration factors and the desired properties in the resistant dextran fiber of the invention. The agglomeration factors included the ratio of liquid spray to dry material, drying temperatures, and the resultant particle size, bulk density, and water activity of the agglomeration matter to achieve the desired solubility and organoleptic properties. Agglomeration trials that managed to form particle size bell curve of 60-80 mesh, a bulk density of about 0.33 g/cm$^3$ to about 0.39 g/cm$^3$, and water activity below 0.3a$_w$ yielded the desired solubility and taste quality. Water activity can be measured using a variety of methods such as resistive electrolytic hygrometers, capacitance hygrometers, and dew point hygrometers that a skilled artisan understands may produce small reading variations but nevertheless are included in the values described above. In this case, water activity was measured by using a commercially available apparatus by Novasina NV. Typically, particle size range should be from about 20 to about 120 mesh, preferably from about 40 to about 90 mesh, and more preferably from about 60 to about 80 mesh. The bulk density range should be from about 0.25 g/cm$^3$ to about 0.45 g/cm$^3$, preferably from about 0.30 g/cm$^3$ to about 0.40 g/cm$^3$, and more preferably from about 0.32 g/cm$^3$ to about 0.39 g/cm$^3$. Water activity should be below 0.35a$_w$ and preferably below 0.3a$_w$.

Rice bran extract in the form of rice hull was found to induce "cane sugar" like flavor along with a flavor masking effect, which were further enhanced when the rice hull was treated with the additional processing steps described below. As defined herein, unless otherwise indicated, the term "cane sugar" refers to sugar produced from the juice of cane sugar, such as evaporated cane juice powder or tabletop equivalents.

Whereas the resistant dextrin fiber ingredient at a minimum should be about 60% to about 70% resistant dextrin as an ingredient in the composition, the resistant dextrin fiber ingredient requires an additional processing step in order to yield desired solubility and binding properties. The additional processing step involves agglomeration of the fiber with a specific ratio range of liquid spray to dry material. Typically, the ratio of liquid spray to dry material is from about 13:87 to about 18:82 by weight and preferably from about 14:86 to about 15:85 by weight. Typically, the drying temperature is from about 30° C. to about 60° C., and preferably the drying temperature is from about 30° C. to about 40° C.

One method to obtain the processed rice extract used in the compositions of the invention is to further process rice hull that is the fibrous outer layer of rice bran. It is understood that, although the following narrative speaks about rice hull, the process is also applicable to other sources of rice extract including, but not limited to, rice bran, rice germ, and rice starch. Rice hull is extracted and processed via existing technologies known by the art as hulling. Sometimes the process is modified to accommodate specific needs related to specific commercial applications. Rice hull has been used for different purposes including as an excipient (flow agent) in nutraceutical powders, a substrate in paper milling, and a dietary ingredient in animal feed and baking products. The manufacturing protocol of rice hulls involves five steps following the hull collection: grinding, sifting, steam sterilization, Rare Earth magnet/Metal detector (used to remove metal residues from processing), and packaging. While rice hull processing technology is known in the art, the present invention required a modification to the known process to enhance the hull's aromatic characteristics and thereby improve its masking/flavoring effect and obtain the especially processed rice extract desired organoleptic properties. Specifically, since rice hull was never before used as a flavoring agent in sugar replacement products, a special preparation method was created to maximize its capacity to mask afternotes and mimic the flavor of cane sugar. After completing the above-described steps, the processed rice hull is treated as follows to yield the processed rice extract.

Rice hull has a high concentration of silica allowing for the use of the rice hull as an anti-caking agent and a natural substitute for silicon dioxide (a synthetic excipient). This also contributes to the rice hull's "cane-sugar" like flavor property. It is believed that this may be due to a structural homology between rice hull and cane-sugar bagasse, which is also rich in silica. Since all existing brands of rice bran extracts, including rice hulls, are not produced to serve as flavoring agents, generic rice hull, not produced as such, are only partly successful yielding a weak masking and flavoring effect.

Enhanced masking/flavoring properties were achieved when rice hull powder was further processed via a specially designed agglomeration—like protocol involving exposure to spraying and heat drying. Not to be limited by theory, it was expected that extra exposure to spraying and drying would release aromatic (flavor-inducing) compounds and thereby yield a hull product with a more powerful flavoring/masking effect. Typically, the rice hull was further processed by wetting the rice hull with water, followed by drying under heat for a time sufficient to achieve a dry processed rice extract. In particular, the rice hull was wetted with water in a weight percentage of about 14% to about 18% water to weight of rice hull powder, preferably about 14% to about 16% by weight of water to rice hull powder. The wetted rice hull powder was dried at a temperature of about 50° C. to about 100° C., and preferably at a temperature of about 80° C. to about 100° C. to yield a processed rice extract. It is understood by the skilled artisan that drying times will vary depending on the amount of wetted rice hull powder that is dried.

The basic rice hull process includes steps known in the art such as hulling, separation, grinding, sifting, and steam sterilization. The invention includes an extra processing step of rice hull involving exposing the rice hull to an agglomeration spray drying protocol. In particular, the rice hull was wetted with water in a weight percentage of about 14% to about 18% water to weight of rice hull powder, preferably about 14% to about 16% by weight of water to rice hull powder. The wetted rice hull powder was dried at a temperature of about 50° C. to about 100° C., and preferably at a temperature of about 80° C. to about 100° C. to yield a processed rice extract. The drying time depends on the amount of spray, the drying temperature, and the amount of material used. For example, the drying time range of about 30 to about 60 minutes should be sufficient to achieve a desired dryness of about 10 to 25 KG in the final product. The process of wetting and drying of matter in the agglomeration protocol described herein can be replaced with other methods of spray-drying known in the art. Those skilled in the art understand that some adjustments may be needed depending upon equipment and drying method used.

In a particular process, the rice hull that yields the processed rice extract used in the compositions of the present invention was further processed by spraying the rice hull powder with water in a weight ratio of about of 14% to about 16% spray to powder to yield a wet powder. Subsequently, the wet powder was dried at a temperature of about 80° C. The subsequently dried rice hull yielded a processed rice extract with peak aromatic/flavor enhancement. A skilled artisan readily understands that an inverse correlation exists between the heating temperature and the time required for drying. The skilled artisan can determine drying time required based on heating temperatures to yield the hull desired properties, particularly when using different industrial utilities or different spray drying methods.

The results have shown that having rice hull powder sprayed by water in a ratio of about 14% to about 16% spray to powder, and subsequently dried at a temperature of about 50° C. to about 100° C. for a time sufficient to yield a hull with a moisture level below 4% by weight of the composition, yielded the rice hull with peak aromatic/flavoring enhancement. Trials with wetted rice hull dried at the same temperature or higher temperatures over a longer period of drying time, yielded no further improvement in aromatic flavor.

Some adjustments in the above protocol my need to take place in accordance with operational protocols of different agglomeration utilities.

In spite of being insoluble in water, rice hull in both untreated and processed form has yet shown to fully dissolve within the composition below a concentration threshold of 0.75% by weight and preferably below the concentration of 0.5% by weight of the dry composition. As long as the percentage of the rice hull component (untreated or processed form) was at or below the threshold of 0.5% by weight of the composition, the hull demonstrated fair solubility in liquids, leaving the least amount of insoluble residues thereafter.

In some embodiments, the invention comprises a natural sweetening flavor agent in a liquid and/or dry form that will have the usability of a natural flavoring agent and the function of a sugar replacement agent in a ratio of about 1:1 to 1:13 sweetening flavor to sugar, without sacrificing and of the desired organoleptic properties and sweetness onset of sugar upon replacement of sugar in food products and beverages. The sweetening flavor agent can be advantageous to manufacturers acting as a flavoring agent and a sugar substitute; thereby sparing the need for balancing sweetener and flavor ingredients in food applications involving sugar replacement. Generally, such replacements require extensive formulation and generally fail to yield desired organoleptic properties of sugar.

The compositions of the invention can be used to flavor and/or replace sugar in all food product categories. Food product categories include, but are not limited to, baking goods, beverages, confections, and the like. The invention can be used in tabletop products and in products suitable for consumption by subjects under a sugar-restrictive (low sugar) diet.

The compositions can be used in beverages, broths, and beverage preparations. The amount of the sweeteners of the invention may vary depending on the desired sweetness and other characteristics of the product. Other food products include candies, chocolate, desserts, snacks, bread, cakes, cookies, pastries, cereal, granolas, yogurt, cocoa beverages, ice-cream, coffee beverages, juices, and soft drinks. Soft drinks may be carbonated or non-carbonated.

The sweetener composition can be used in pharmaceuticals, assays, diagnostic kits, and therapies. Examples of such include, but are not limited to, weight control products, nutritional supplements, vitamins, infant diets, diabetic diets, athletic diets, geriatric diets, low carbohydrate diets, low fat diets, low protein diets, high carbohydrate diets, high fat diets, high protein diets, low calorie diets, non-caloric diets, oral hygiene products (e.g., toothpaste, mouthwash, rinses, floss, or toothbrushes), or personal care products (e.g., soaps, shampoos, rinses, lotions, balms, salves, ointments, paper goods, perfumes, or lipstick). The compositions can be used in professional dentistry products, medical, veterinarian, and surgical products (e.g., liquids, chewables, inhalables, injectables, salves, resins, rinses, pads, floss, implements).

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

EXAMPLES

Example 1: Liquid Sweetening Flavor Citrus

Monk fruit juice extract in liquid form and lemon oil extract in powder form were mixed in a variety of weight ratios. The monk fruit juice comprised 3.5% mogroside V by weight with an overall content of 13% mogrosides by weight. The lemon oil extract was cold pressed from lemon peel and pulp and comprised 50-90% limonene by weight. The weight ratio range between the Monk fruit juice and the lemon extract in the composition was 9:1 to 19:1. The weight ratio of monk fruit juice to lemon oil extract was 90:10 to 95:5.

The compositions of the example were tested to determine their sweetness properties. The compositions were 10 to 13 times sweeter than sugar as calculated by the refractometer measurement of ingredients as compared to sucrose sweetness in equivalent concentrations by weight. Sugar sweetness was calculated as equivalent to 5 g sugar in 100 g water (5 Brix°) per one measure of sweetness (1×1 sugar sweetness). The glycemic property was evaluated based on the glycemic value of the components of the composition. Commercially used monk fruit and stevia extracts have minimal glycemic effects and lemon oil extract has no glycemic effect.

Example 2: Resistant Dextrin Fiber Based Sugar Substitute

Resistant dextrin fiber comprising 70% by weight resistant dextrin (978 g fiber) was mixed with monk fruit extract (10 g), vanillin (2 g), and rice bran extract (10 g) to yield a one kilogram mixture. The composition's final ingredient concentration was resistant dextrin fiber 97.8%; monk fruit extract 1%; rice bran extract 1%; and vanillin 0.2%. The results yielded a composition with a low glycemic index and sugar-like organoleptic and binding properties. The glycemic index was evaluated with a glycemic response study. Two lemonades were prepared from a stock solution of lemon juice from half a lemon and 750 mL of water. Lemonade A had 40 g of the test composition; and Lemonade B had 40 g of sugar. In a single blind experiment, each subject was given both lemonades while blood glucose was monitored (BGM) and YSI was determined. FIG. 1 illustrates the overall results of the blood glucose monitor, demonstrating the composition does not raise glucose levels compared to the sugar containing composition that increased blood glucose levels.

Figure 2A:
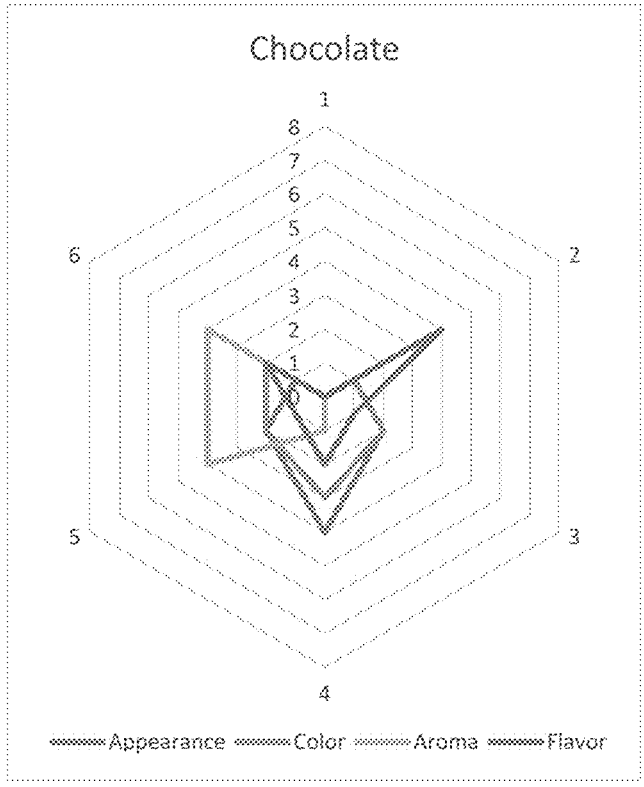
FIGS. 2A and 2B illustrate the results of the comparative organoleptic evaluation of a chocolate product made with a composition of the invention as compared to equivalent sugar made chocolate.
Figure 2B:
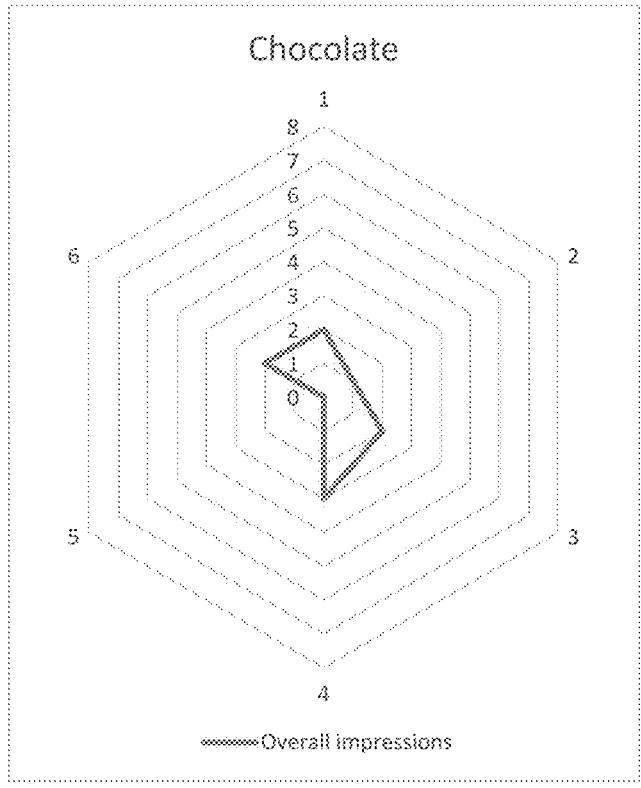
Figure 3:
FIG. 3 illustrates a flow chart of a general process for treating rice hull.
Figure 3:
Figure 3:
Figure 3:
Figure 3:

The organoleptic properties were studied using a 10-panel sensory panel. The panelists were asked to evaluate two products, a chocolate product and a muffin (a baking good product). Each product was made in two versions, a sugar containing product defined as Product S; and a composition containing product defined as Product X. The panelists were asked to evaluate each product as a comparison between Product S and Product X on six degrees of similarity: 1. No resemblance; 2. Different; 3. Similar; 4. Closely resembles; 5. Identical; and 6. Better. The evaluated organoleptic categories included appearance, color, aroma, flavor, and overall impression. FIGS. 2A-2B illustrate the results of the organoleptic evaluation for the chocolate product. FIG. 2A illustrates the results of appearance, color, aroma and flavor, where 1=no resemblance; 2=different; 3=similar; 4=closely resembles; 5=identical; and 6=better. The results of FIG. 2A clearly illustrate that while the flavor of the products made with the composition was perceived as slightly different, the appearance, aroma, and flavor tested favorably as compared to the sugar made products. FIG. 2B illustrates the overall impression where 1=I like S product but not X product; 2=I prefer the taste of product S; 3=I prefer the sweetness level of product S; 4=I like product S and product X equally; and 5=I prefer the sweetness level and taste of product X. FIG. 2B illustrates that the products made with the compositions of the invention are indistinguishable from sugar made products.

Example 3: Liquid Sweetening Flavor Citrus

Monk fruit juice in liquid form having 13% mogroside V by weight and lemon oil extract in a powder form comprising 50-90% limonene by weight were mixed in a combination of 90% to 10% by weight, respectively. The monk fruit juice was obtained by extracting monk fruit with distilled water at a temperature of 90° C. for 3-4 hours. The water solution was reduced in volume using a high efficiency vacuum concentrator (such as those sold by Labconco™ (Kansas City, Mo) or ThermoFischer Scientific (Waltham, MA)) until a syrup with 50% solids by weight was obtained. The final monk fruit extract had a water percentage of 50% by weight, and a pH in the range of 4.55 to 5.

Example 4: Liquid Sweetening Flavor Agent Citrus

Monk fruit juice concentrate in liquid form was mixed with lemon oil extract powder in a weight ratio of 95/5% by weight, respectively.

The compositions of Examples 4 and 5 were tested using a similar method as described in the Example 3. The liquid sweetening flavor compositions in Examples 4 and 5 had a sweet citrusy note, while the composition of Example 4 had a milder citrusy note than that of Example 3. Both compositions of Examples 4 and 5 had a sweetness level equivalent to about 10-13× sucrose (50-65 Brix°) calculated as described in Example 1. The sugar sweetness level (1×1) was calculated as equivalent to that of 5% sugar by weight of water solution (5 Brix°).

Example 5: Sweetening Fiber

Resistant dextrin fiber was mixed with monk fruit extract, vanillin, and processed rice bran extract. The weight ratio between vanillin:processed rice bran extract:monk fruit extract was 1:7:5. The composition had resistant dextrin fiber in 96-98% by weight; monk fruit extract in 0.5% to 2% by weight; rice bran extract in 0.5% to 1.5% by weight; and vanillin 0.1% to 0.5% by weight. The compositions of Example 5 showed similar organoleptic properties as those of Example 2.

Example 6: Resistant Dextrin Fiber Preparation

Agglomeration protocol included water sprayed over dry powder in a weight ratio of 16.45% spray to 83.24% resistant dextrin powder. The spray was applied at a rate of 2.065 lbs. water per minute for approximately 45 minutes to ensure formation of durable matrix. The processing bed was kept at a temperature range of about 32° C. to about 38° C. After a particle size in the range of 60 to 80 mesh was created, the spraying pump was reduced to a rate of 0.96 lbs. spray per minute to ensure maintenance of particle size and achieve the target moisture content of <5%. Total process time to achieve the run was around 60 minutes. One of skill in the art understands that some adjustments to the above process may be necessary depending upon operational protocols of different agglomeration utilities.

The product had a bulk density of about 0.32 to about 0.35 g/cm³ and a moisture level of 4.5% by weight. The particle size distribution was between US60 Mesh to US80 mesh, where the most retained particle size was US60 Mesh.

Example 7: Liquid Sweetening Flavor Vanilla

Monk fruit juice in liquid form was mixed with vanillin in a powder form in a concentration ratio of 90/10% and 95/5% monk fruit juice to vanillin. The monk fruit juice had 13% MV by weight of the extracts.

The sweetness of compositions were evaluated and were 10 to 13 times sweeter than sugar equivalent to 50-65 Brix° 91. As explained in Example 1, the sweetness evaluation was calculated in comparison to sucrose sweetness at equivalent concentrations by weight. Sugar sweetness level (1×1) was calculated as equivalent to that of 5% sugar by weight of water solution (5 Brix°). As in Example 1, the glycemic evaluation was determined per the combined glycemic values of the components in the composition.

Example 8: Sweetening Fiber Syrup

Resistant dextrin fiber syrup comprising dextrin solids in a concentration range of 50%-90% and a water content in a concentration range of 50%-10% by weight of the fiber composition was mixed with liquid monk fruit juice comprising 13% MV, vanillin from clove derived eugenol oil, and rice bran extract namely rice hull. The ratio range between the fiber syrup to monk fruit juice was 19:1 to 1:1 by weight. The ratio range between the fiber syrup to vanillin was 50:1 to 19:1 by weight. The ratio range between the fiber syrup and rice extract was 20:1 to 300:1 by weight. The composition comprised resistant dextrin fiber syrup in a concentration range of 45%-95% by weight; monk fruit juice in a concentration range of 5% to 55% by weight, vanillin in a concentration range of 0.1%-3% by weight and rice extract in a concentration range of 0.15%-0.4% by weight.

Example 9: Sweetening Fiber Syrup

Resistant dextrin fiber syrup was mixed with liquid monk fruit juice, and vanillin from clove derived eugenol oil. The ratio range between the fiber syrup and monk fruit juice was 19:1 to 1:1 by weight. The ratio between the fiber syrup and vanillin was 450:1 to 33:1. by weight. The composition had resistant dextrin fiber syrup in a concentration range of 45%-95% by weight; monk fruit juice extract in a concentration range of 50%-5% by weight; and vanillin a concentration range of 0.1% to 3% by weight.

Example 10: Sweetening Fiber Syrup

Resistant dextrin fiber syrup was mixed with monk fruit extract and lemon oil extract. The ratio range between the fiber syrup to monk fruit juice was 19:1 to 1:1 by weight. The ratio between the fiber syrup to lemon oil extract was 4:1 to 32:1 by weight. The composition comprised resistant dextrin fiber syrup in a concentration range of about 45% to about 95% by weight; monk fruit juice extract in a concentration range of about 50% to about 5% by weight; and lemon oil extract in a concentration range of about 1.5% to about 9% by weight.

The compositions in Examples 8, 9, and 10 were low glycemic as tested in a glycemic response study provided in FIG. 1. It is to be understood that the compositions in Examples 8, 9, and 10 comprised same solid residues as those in Example 5, which was tested for glycemic response as shown in FIG. 1. It is also to be understood that it is the solid residues or solutes in the compositions that induce glycemic effects (water has no glycemic effect). All compositions had sugar syrup-like taste profile and binding properties; however, they differed in their flavor characteristics. Whereas the composition in Example 8 had a more natural flavor, the composition in Example 9 had a vanilla accent, and the composition in Example 10 had a citrusy accent. When applied to food products, the compositions induced a sweetness onset similar to that of sugar detectable via sensory test as shown in FIG. 2.

Example 11: Sweetening Fiber Syrup

Resistant dextrin fiber syrup was mixed with monk fruit juice extract, vanillin, and processed rice bran extract. The ratio between the fiber syrup to monk fruit juice extract was 1:99 to 1:4 by weight. The ratio between fiber syrup to vanillin was 4:1 to 10:1 by weight. The ratio between the fiber syrup and the rice extract was 200:1 to 40:1 by weight. The composition had resistant dextrin fiber syrup in a concentration range of 1%-20% by weight of the composition; monk fruit juice in a concentration range of 80%-99% by weight of the composition; vanillin in 0.2% to 2% by weight of the composition; and rice extract in 0.1% to 0.5% by weight of the composition.

Example 12: Sweetening Fiber Syrup

Resistant dextrin fiber syrup was mixed with monk fruit juice extract, vanillin, and lemon oil. Typically, the ratio between the fiber syrup, monk fruit juice, vanillin and lemon oil extract are 19:1:0.1:0.1, and preferably 99:0.9:0.05:0.05 by weight. Typically, the concentration ratio between the fiber syrup, monk fruit juice, vanillin and lemon oil extract were 95:5:0.5:0.5% and preferably 99:0.9:0.05:0.05% by weight.

The composition was low glycemic, as shown in FIG. 1. The onset of sweetness and organoleptic characteristics were surprisingly equivalent to those of honey and detectable via sensory test. The sweetness was measured as the combined sweetness values of the ingredients, calculated as described in Example 1.

It is to be understood that the monk fruit component in all the compositions presented herein can be replaced with high purity or enzymatically modified stevia extract, having steviol glycosides content at a concentration range of 80%-99% by weight of the extract. The replacement of monk fruit extract with stevia extract should be at the same concentration ranges as those presented by weight of the sweetening components in the compositions thereof.

The invention claimed is:

1. A sugar substitute composition comprising:
resistant dextrin fiber,
at least one sweetening agent,
at least one flavorant, and
processed rice extract,
wherein the resistant dextrin fiber is present in an amount of about 90% to about 99% by weight of the composition,
wherein the processed rice extract is present in an amount of about 0.3% to about 2% by weight of the composition, and
wherein the processed rice extract is made by wetting the rice hull with water in a weight percentage of about 14% to about 16% by weight of the water to rice hull followed by drying at a temperature of about 50° C. to about 100° C.

2. The sugar substitute composition according to claim 1, wherein the resistant dextrin fiber is present in an amount of about 96% to about 99% by weight of the composition.

3. The sugar substitute composition according to claim 1, wherein the processed rice extract is present in an amount of about 0.5% to about 1.5% by weight of the composition.

4. The sugar substitute composition according to claim 1, wherein the sweetening agent is present in an amount of about 0.2% to about 2% by weight of the composition.

5. The sugar substitute composition according to claim 1, wherein the sweetening agent is monk fruit extract, stevia extract, or a combination thereof.

6. The sugar substitute composition according to claim 5, wherein the monk fruit extract has 3.5% to 60% mogroside V by weight.

7. The sugar substitute composition according to claim 5, wherein the monk fruit extract has 13% mogroside by weight.

8. The sugar substitute composition according to claim 1, wherein the flavorant is present in an amount of about 0.1% to about 2% by weight of the composition.

9. The sugar substitute composition according to claim 1, wherein the flavorant is at least one of vanillin, lemon oil, acetic acid, citric acid, lactic acid, cinnamon, ginger extract, cocoa, coffee, cardamom, milk minerals, curcumin, turmeric, fruit flavor extract, almond extract, hazelnut extract, pistachio extract, or peanut extract.

10. The sugar substitute composition according to claim 1, wherein the flavorant is vanillin, lemon oil, or a combination thereof.

11. The sugar substitute composition according to claim 1 further comprising at least one of flavoring ingredients, dairy-derived ingredients, salts, thickeners, anticaking agents, gum base, or coloring agents.

\* \* \* \* \*